(No Model.)

C. G. LARSON.
DEVICE FOR DRAWING TUBES.

No. 519,086. Patented May 1, 1894.

WITNESSES:
A. B. Degges
L. D. Heinrichs

INVENTOR:
Carl G. Larson
By Henry Connett
Attorney.

UNITED STATES PATENT OFFICE.

CARL GUSTAF LARSON, OF SANDVIKEN, SWEDEN.

DEVICE FOR DRAWING TUBES.

SPECIFICATION forming part of Letters Patent No. 519,086, dated May 1, 1894.

Application filed September 19, 1893. Serial No. 485,753. (No model.)

*To all whom it may concern:*

Be it known that I, CARL GUSTAF LARSON, a subject of the King of Sweden and Norway, residing in Sandviken, Sweden, have invented certain new and useful Improvements in Devices for Drawing Pipes and Tubes, of which the following is a specification.

My invention relates to a gripping device for seizing and holding pipes and tubes while the same are being drawn.

In the ordinary way of drawing tubes it is customary to reduce the extremity thereof and then screw-thread it, in order to provide a secure fastening for the tool or plier used for drawing the tube through the draw-plate and over the mandrel introduced into the pipe. In order, however, to enable the plier to grasp the tube properly and firmly, it is deemed necessary to hammer or forge the tube solid at its extremity, or in some other way to prevent the plier from crushing the tube. All of this has the effect to consolidate and destroy a considerable portion of the tube, which portion must be cut off, thus entailing the loss of that much in length of pipe, the expense of preparing the pipe to receive the plier and the expense of cutting off the pipe.

The object of the present invention is to provide a gripping device for use in drawing tubes and pipes, which obviates the necessity of forging solid the end of the pipe and screw-threading it to receive the said device or receive the tool and which destroys only a small part of the end of the tube.

This drawing tool or gripping device will be hereinafter fully described with reference to the accompanying drawings, wherein—

Figure 2:
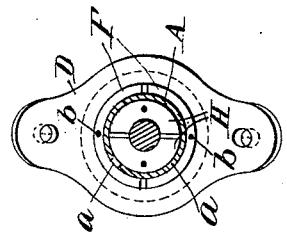
Figure 5:
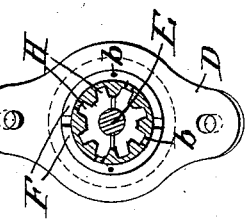
Figure 1:
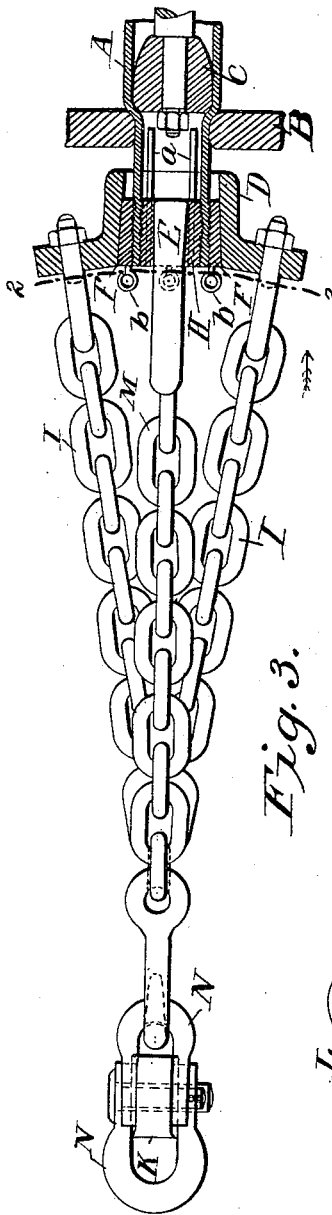
Figure 3:
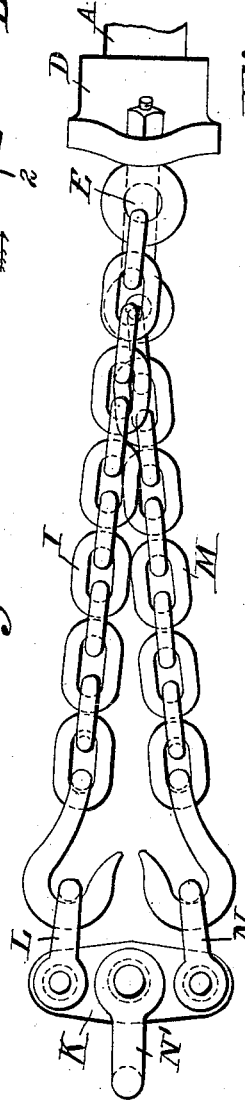
Figure 4:
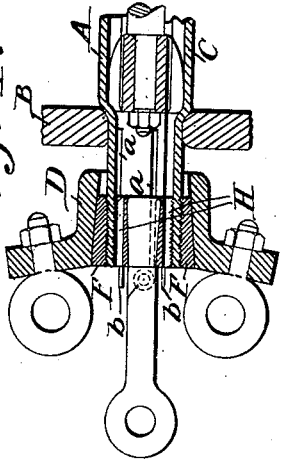
Figure 6:
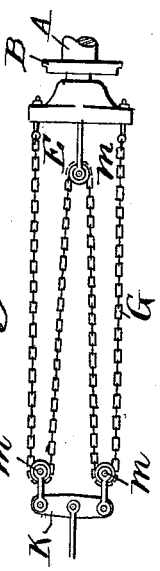

Figure 1 is a longitudinal mid-section of the device, and Fig. 2 is a transverse section substantially on the line 2, 2, in Fig. 1. This view is, in substance, an end view of the gripping device or tool. Fig. 3 is a side view of the draw-chains, the plane of the view being at right-angles to that of Fig. 1. Figs. 4 and 5 are views similar to Figs. 1 and 2, illustrating a slight change in the construction; and Fig. 6 is a view on a small scale illustrating an alternative construction of the draw-chains.

Referring first to Figs. 1, 2 and 3—A is the tube or pipe being drawn, the end of which has been slitted at four points, a, and reduced so that it may be passed through the hole in the draw-plate, B, and C is the mandrel in the pipe.

D is an outer hoop, or ring provided with lugs as a means of attachment for the draw-chains, and E is the core, provided also with an eye whereby it is secured to a draw-chain. The aperture or bore in the hoop D is flared outwardly, or from the draw-plate, and it embraces an outer shell, F, which is separated into two halves by a longitudinal indivision and is tapered exteriorly to fit the hoop D. The sections of the shell F embrace the pipe A snugly. The core E is tapered, as shown, its larger end being next to the draw-plate; and embracing the core and between it and the tube A, is an inner shell, H, split like the shell F. The shell H is tapered interiorly to fit the core E. It will be seen by inspection that the tube, at its reduced end, is clamped between the shells F and H, the former applied exteriorly and the latter interiorly.

Owing to the taper of the parts as described it will be obvious that if a pulling strain or force be applied to the ring D or core E, either or both, the effect will be to clamp the tube so much the tighter between the shells F and H. I pull on both the ring D and core E in drawing the tube A through the draw-plate, and to provide for this I employ, by preference, the arrangement seen in Figs. 1 and 3. Two chains, I, I, connected to the respective opposite lugs on the ring D at one end, are connected at the other end to a link or eye L, pivotally attached to one end of a bar K; and a chain M, connected at one end to the core E, is connected at the other end to a link or eye N, pivotally attached to the other end of the bar K. The bar K is provided with a drawing link, N', pivotally attached to the bar between the eyes or links L and N, as seen in Fig. 3. The bar K forms an equalizer.

In Fig. 6 another arrangement of the drawing chains is shown. In this arrangement a single chain G is secured at its ends to the respective lugs on the ring D, and is rove over sheaves, m, m, m, as clearly shown. The shells F and H may be provided with handles b, as shown, and they may have roughened surfaces where they bear on the pipe, the better to prevent slipping. This is indicated in Fig. 4.

Figs. 4 and 5 also illustrate the application of my invention to drawing tubes having longitudinal corrugations or ribs, as indicated in Fig. 5. In this case, as in any case, the shells F and H will be of the proper contour to fit the tube.

With my gripping and drawing device only a very small part of the end of the tube will be injured as compared with the old method of operating.

I have shown (see Fig. 2) the shells F and H each divided longitudinally into two sections or halves, and the reduced end of tube A divided into quadrants or quarters by longitudinal slits.

Any suitable flexible connectors may be used in lieu of the chains I, M and G, as a wire rope for example; but chains are preferred.

Having thus described my invention, I claim—

1. In a device or tool for drawing pipes and tubes, the combination with a hoop, D, having a flaring aperture or bore, and a tapered core E, adapted to enter the end of the pipe to be drawn, of the sectional pipe-clamping shells, F and H, the shell F being tapered exteriorly to fit within the hoop D, and the shell H being tapered interiorly to fit the core E, substantially as set forth.

2. In a device or tool for drawing pipes and tubes, the combination with the clamp, comprising the ring, the core, and the sectional clamping shells, of the equalizing bar, and connectors coupling the extremities of said bar with the said hoop and core, substantially as set forth.

3. In a device or tool for drawing pipes and tubes, the combination with the clamp, comprising the hoop, the core, and the sectional clamping shells, of the equalizer bar K, the drawing link pivotally attached thereto, the links or eyes pivotally secured to the respective ends of said bar, a flexible connector which couples the said core to one of said links or eyes and flexible connectors which couple the said hoop to the other of said links or eyes, substantially as set forth.

In witness whereof I have hereunto signed my name in the presence of two subscribing witnesses.

CARL GUSTAF LARSON.

Witnesses:
GOTTF. RAMBERG,
CARL TH. SUNDHOLM.